United States Patent [19]

Friedli et al.

[11] Patent Number: 5,770,328
[45] Date of Patent: Jun. 23, 1998

[54] BATTERY PACKAGING SYSTEM AND CLIP FOR SAME

[75] Inventors: Charles W. Friedli, Duluth; Kevin D. Page, Dacula, both of Ga.

[73] Assignee: Motorola, Inc., Schaumburg, Ill.

[21] Appl. No.: 676,012

[22] Filed: Jul. 5, 1996

[51] Int. Cl.[6] .................................................. H01M 2/04
[52] U.S. Cl. .......................... 429/96; 429/100; 429/175
[58] Field of Search ........................... 429/175, 96, 100, 429/163

[56] References Cited

U.S. PATENT DOCUMENTS 4,857,422  8/1989  Stocchiero ........................... 429/175
5,283,137  2/1994  Ching ................................... 429/175

*Primary Examiner*—M. Nuzzolillo
*Attorney, Agent, or Firm*—Scott M. Garrett; Kenneth M. Massaroni; Kelly A. Gardner

[57] ABSTRACT

A battery packaging system (10) packages a battery cell or cells (26) in a housing member (12). A clip (14) is used to retain the battery cells in the housing member, and has cantilevered clip fingers (32) which engage openings (22) formed on the rim (20) of the housing member. The clip compressionally or resiliently engages the battery cells, so that they are tightly held in the housing, by retaining fingers (40) formed in the retaining surface (28) of the clip. A cap (16) may be attached to the clip, and provides a peripheral skirt (54) which covers the openings so that the clip is not removable.

17 Claims, 3 Drawing Sheets

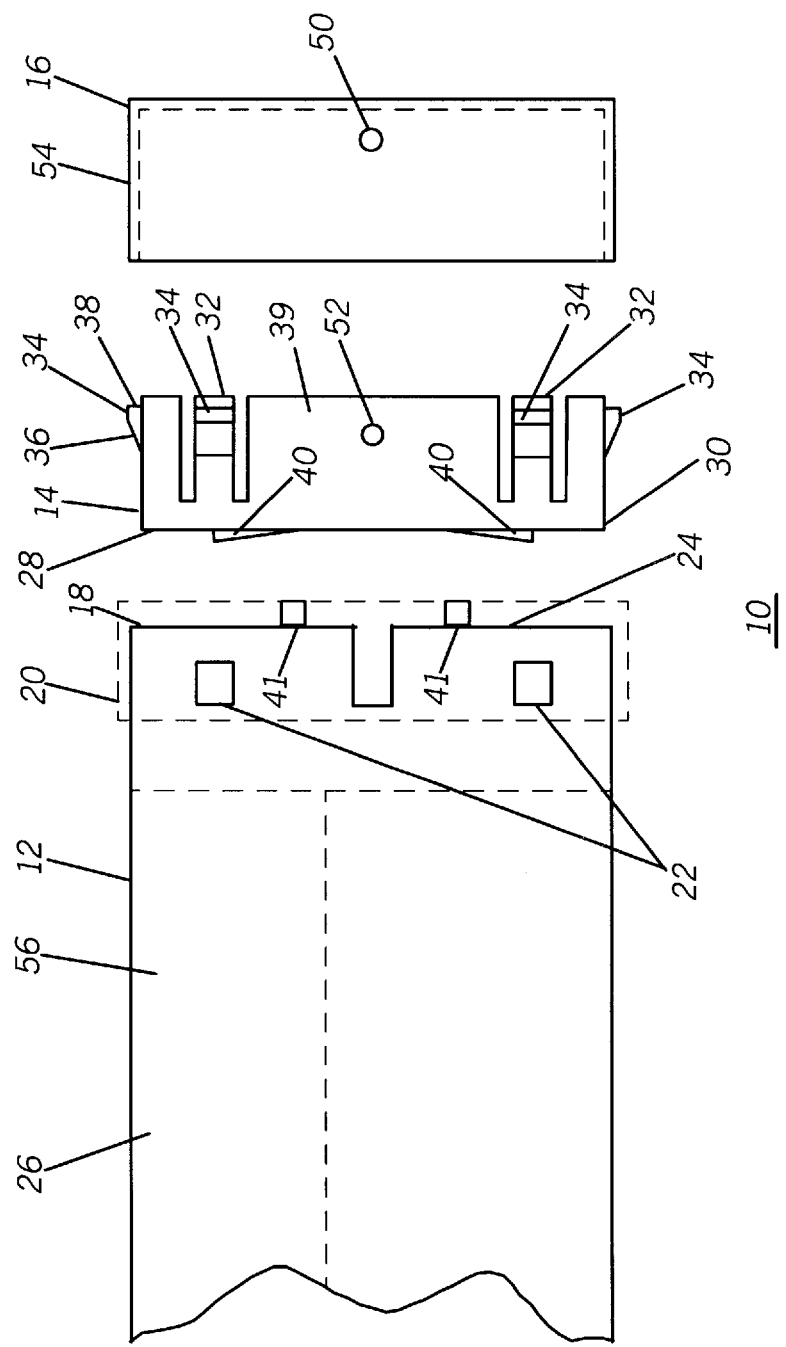

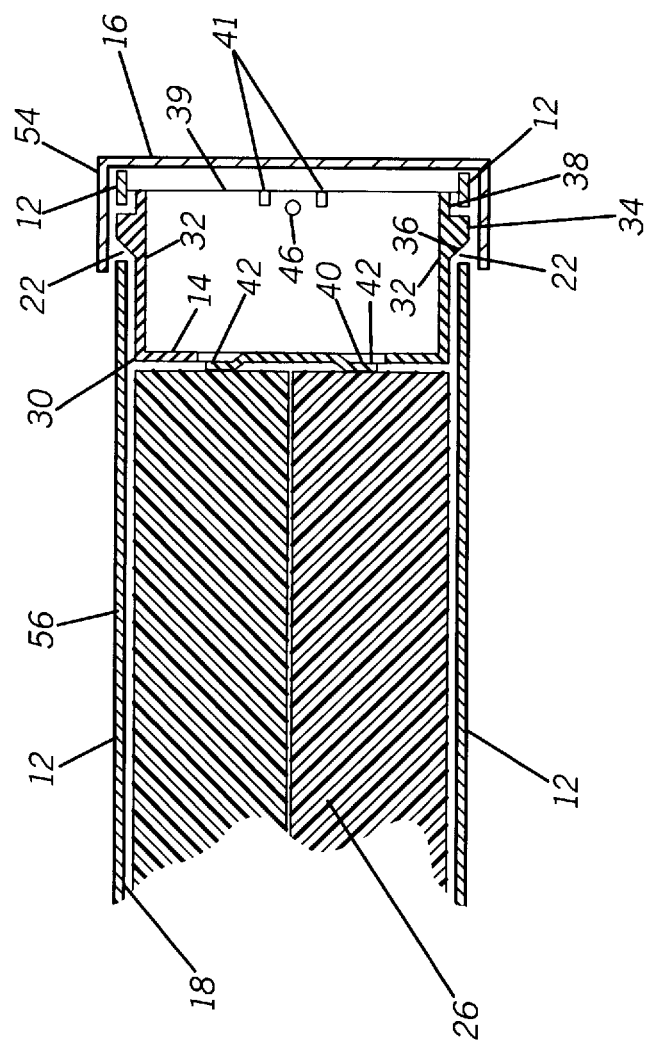

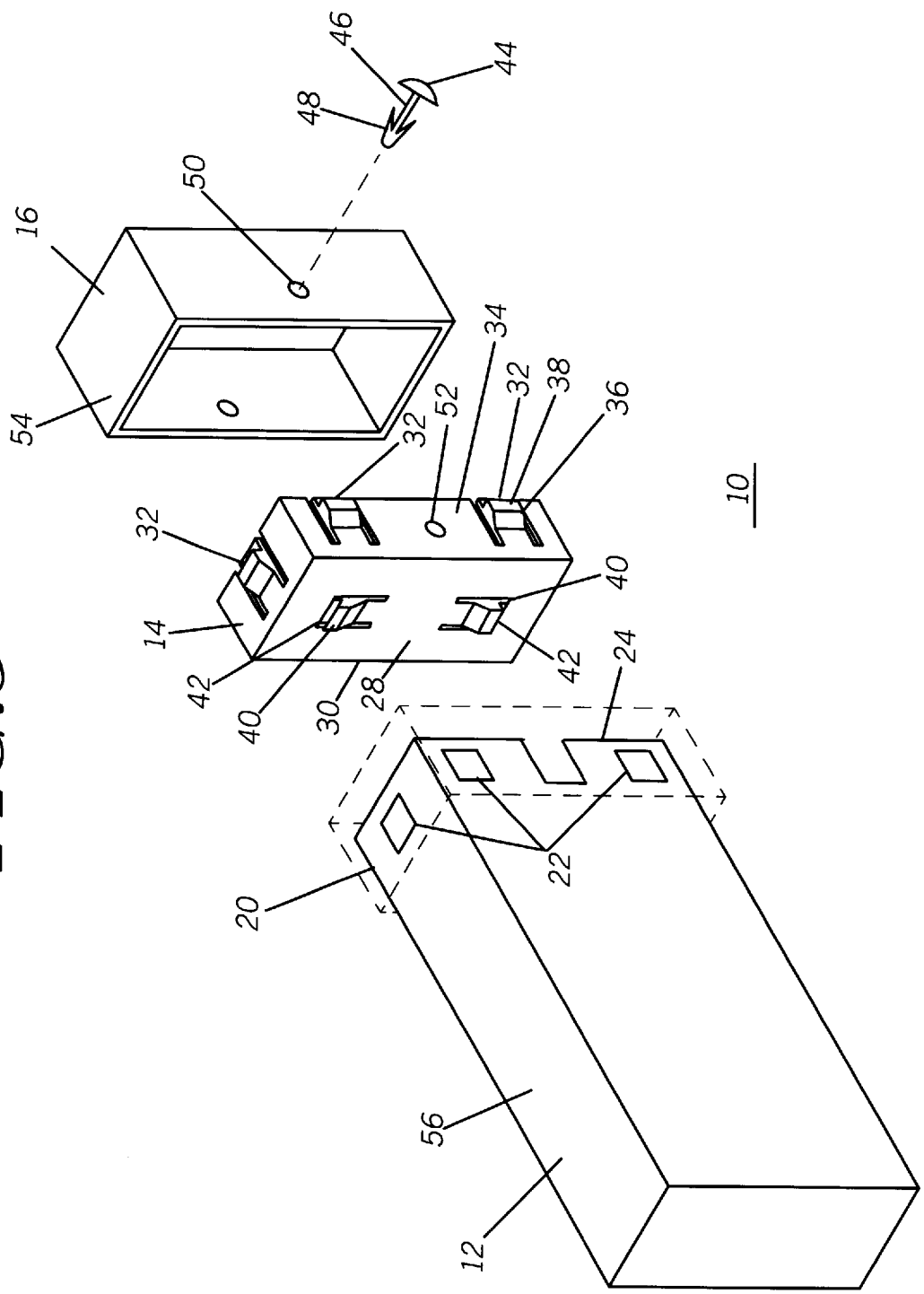

BATTERY PACKAGING SYSTEM AND CLIP FOR SAME

TECHNICAL FIELD

The inventions relates in general to battery packs, and more particularly to assemblies for retaining battery cells therein.

BACKGROUND

In packaging many electrical and electronic devices, ultrasonic welding is often employed to join housing portions of the package. Ultrasonic welding has an advantage over other methods of fastening such as, for example, screws, especially when the housing portion are not meant to come apart. For example, a battery pack for a portable communications device must be small, lightweight, and typically does not contain serviceable parts. By using ultrasonic welding in assembling such a battery pack, the weight and space of screws and screw bosses are eliminated.

Ultrasonic welding can be used on a variety of materials, and is particularly suitable for use with plastic. It is a technique widely used among manufacturers of battery pack for portable devices. However, there have been several problems encountered with ultrasonic joining. First, if the parts to be joined are not properly designed and aligned, small amounts of molten stock can be forced out of the weld seam during the operation. This ejectus is referred to as "flashing", and is considered to be a cosmetic defect. In addition to flashing, another cosmetic defect occurs when the parts are burned by the operation, as may occur when the parts are improperly positioned, or if the weld energy is excessive. A third type of defect occurs when the contents of the package are damaged by ultrasonic vibration. In particular, small surface mounted electronic components can be severely affected. This type of defect may not be noticed until the device is in the hands of the consumer.

In the manufacture of battery packs, ultrasonic joinery is used to weld a cap, or cover onto a housing member, thereby capturing battery cells inside. In this process, the cap or cover is forced against the battery cells so that the cells are tightly captured. This prevents the cells from moving, and reduces the chance of breaking the housing from mechanical shock, such as occurs upon dropping the battery pack. However, due to manufacturing variations, the sizes of battery cells can be different for one cell to the next. Therefore, the housing member and cover must be designed to allow the largest tolerance of cells, while still being able to securely hold the smallest tolerance of cells. For this reason it is important for the cap or cover to resiliently engage the cells, thus allowing compression of the resilient means to effectively secure all variations of cell sizes for a given nominal size.

Therefore, given the problems associated with ultrasonic joinery of battery packages, there exists a need for a package utilizing an alternative means for securing a cap or cover to a battery pack housing member. Furthermore, the alternative means should allow for battery cell size variations.

BRIEF DECRIPTION OF THE DRAWINGS

FIG. 1 is an exploded top plan view of a battery packaging system in accordance with the invention;

FIG. 2 is a side cutaway view of a battery pack employing a battery packaging system in accordance with the invention; and FIG. 3 is an exploded isometric view of a battery packaging system in accordance with the invention.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Referring now to FIGS. 1–3, there is illustrated therein an exploded top plan view of a battery packaging system 10, a side cutaway view of a battery pack employing a battery packaging system, and an exploded isometric view of a battery packaging system in accordance with the invention, respectively, in accordance with the invention. The system includes a housing member 12, and a clip 14. Additionally, the system may comprise a cap 16. The housing member has an interior surface 18, and a rim 20 having a plurality of openings 22 formed therethrough. The rim further defines a mouth 24, wherein at least one battery cell 26 (shown in phantom here) may be inserted. Once the battery cells have been placed in the housing member, the clip is inserted into the mouth of the housing member.

The clip has a retaining surface 28 which, upon assembly, is disposed adjacent the battery cells. The retaining surface has an edge or periphery 30, from which a plurality of cantilevered clip fingers 32 extend. It is preferred that the clip fingers are substantially symmetrically disposed about the periphery of the retaining surface. Each of the clip fingers are provided with a retaining protrusion 34, facing outwardly and corresponding to the openings 22 formed through the rim 20 of the housing member. The retaining protrusions comprise a ramp portion 36 and a stop wall 38. As the clip is inserted into the mouth of the housing member, the rim engages the ramp portion of each clip finger, thereby deflecting the clip fingers so that the interior surface 18 of the housing members slides past the ramp portion. Once the stop wall of a clip finger reaches its corresponding opening, the clip finger springs or snaps back to its undeflected position, and the stop wall of the protrusions prevent the clip from being removed. For added stability, the clip may further comprise a wall 39 extending from the periphery of the retaining surface, and corresponding with the interior surface of the housing member. In addition, to further prevent accidental removal of the clip, it is contemplated that a portion or portions 41 of the housing member 12 may be crimped over the peripheral wall.

Additionally, the clip is provided with a means for resiliently engaging the battery cells, such as cantilevered retaining fingers 40 formed in the retaining surface 28 of the clip. This prevents undesirable movement of the battery cells, and allows for the variation of the cell's nominal dimensions. Each retaining finger has a contact end 42, which upon assembly is in contact with a cell, as shown in FIG. 2, and thereby allows the retaining finger to bias the cells away from the clip. Optionally a compressible pad may be disposed on the retaining surface, but this requires an additional part in the assembly.

The cap is provided for both aesthetic reasons, and to cover the openings 22 once the clip is in place, thereby preventing deflection of the clip fingers to prevent removal of the clip. When used, the cap is attached to the clip by any conventional means for attaching the clip to the cap such as, for example, a pin member 44, as shown in FIG. 3. The pin member has a shank 46 and at least one deflectable barb 48. The cap and clip are provided with corresponding openings 50 and 52. Upon placing the clip inside the cap, the opening become aligned, provided a path for the pin member to pass through both pieces. Upon inserting the pin member, the barb or barbs becomes deflected against the pieces until clearing both pieces where they move to their undeflected position, thereby fixing the two pieces together. The cap has a peripheral skirt 54 which, upon assembly of the battery pack, extends over the exterior surface 56 of the housing member covering the openings, as shown in FIG. 2.

In practicing the invention it is preferred that the housing member is a thin walled piece, and made of a rigid material, such as impact extruded aluminum. The clip is preferably a unitary injection molded plastic piece. This allows the various cantilevered members to have the desired spring qualities. The invention has several advantages over the prior art method of ultrasonic welding in constructing a battery package. First, the problems of cosmetic defects and internal damage associated with ultrasonic welding are eliminated. Second, by making the retaining feature an inherent part of the clip, it eliminates the need for any joinery process or joining equipment; the clip is simply inserted into the mouth of the housing member once the cell or cells are in place. A means for retaining the battery cells, such as the use of a clip and cap, provide a permanent closure to the packaging system.

A further advantage is the ease with which different nominal sized cells can be packaged. For example, if two different sizes of cells are used, a different clip may be used depending on which particular size cell is used. For shorter cell, the peripheral wall and cantilevered clip fingers can be elongated, thereby taking up the difference between the cells and the mouth of the housing member. Conventional packages employ, for example, spacers to accomplish the same result. By using a clip in accordance with the invention, the spacer and retaining means are combined into one piece.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A battery packaging system for packaging at least one battery cell, comprising:

a housing member for housing said at least one battery cell and having an interior surface and a rim having a plurality of openings formed therethrough and defining a mouth; and a clip, disposed in said mouth of said housing member, having a retaining surface disposed adjacent said at least one battery cell and having a periphery, a plurality of cantilevered clip fingers extending from said periphery, each said cantilevered clip finger having a retaining protrusion corresponding to, and partially extending through one of said openings, thereby retaining said clip within said mouth of said housing member.

2. A battery packaging system as defined by claim 1, further comprising a cap, attached to said clip, having a peripheral skirt extending over an exterior surface of said housing member covering said plurality of openings.

3. A battery packaging system as defined by claim 1, wherein said retaining surface of said clip has at least one cantilevered retaining finger formed therein, said at least one cantilevered retaining finger having a contact end in contact with at least one of said at least one battery cell for biasing said at least one battery cell away from said clip.

4. A battery packaging system as defined by claim 1, wherein said clip further comprises a wall extending from said periphery corresponding with said interior surface of said housing member.

5. A battery packaging system as defined by claim 1, wherein said retaining protrusion comprises a ramp portion and a stop wall.

6. A battery packaging system as defined by claim 2, wherein said clip and said cap are attached by a pin member passing through a portion of said clip and said cap.

7. A means for retaining at least one battery cell in a housing member of a battery pack, said housing member having an interior surface and a rim having a plurality of openings formed therethrough and defining a mouth, said means for retaining comprising:

a clip, disposed in said mouth of said housing member, having a retaining surface disposed adjacent said at least one battery cell and having a periphery, a plurality of cantilevered clip fingers extending from said periphery, each said cantilevered clip finger having a retaining protrusion corresponding to, and partially extending through one of said openings, thereby retaining said clip within said mouth of said housing member; and a cap, attached to said clip, having a peripheral skirt extending over an exterior surface of said housing member covering said plurality of openings.

8. A means for retaining as defined by claim 7, wherein said retaining surface of said clip has at least one cantilevered retaining finger formed therein, said at least one cantilevered retaining finger having a contact end in contact with at least one of said at least one battery cell for biasing said at least one battery cell away from said clip.

9. A means for retaining as defined by claim 7, wherein said clip further comprises a wall extending from said periphery corresponding with said interior surface of said housing member.

10. A means for retaining as defined by claim 7, wherein said retaining protrusion comprises a ramp portion and a stop wall.

11. A means for retaining as defined by claim 7, wherein said clip and said cap are attached by a pin member passing through a portion of said clip and said cap.

12. A clip for retaining at least one battery cell in a housing member of a battery pack, comprising:

a retaining surface having a periphery;

a plurality of cantilevered clip fingers extending from said periphery of said retaining surface, each of said cantilevered clip fingers having an outwardly facing retaining protrusion; and means for resiliently engaging said at least one battery cell disposed on said retaining surface.

13. A clip as defined by claim 12, wherein said plurality of cantilevered clip fingers are substantially symmetrically located on said periphery of said retaining surface.

14. A clip as defined by claim 12, wherein said retaining protrusion comprises a ramp portion and a stop wall.

15. A clip as defined by claim 12, wherein means for resiliently engaging comprises at least one cantilevered retaining finger formed in said retaining surface, said at least one cantilevered retaining finger having a contact end in contact with at least one of said at least one battery cell for biasing said at least one battery cell away from said clip.

16. A clip as defined by claim 12, further comprising a means for attaching said clip to a cap.

17. A clip as defined by claim 16 wherein said means for attaching comprises a pin member passing through a portion of said clip and said cap.

* * * * *